United States Patent
Rallabhandi et al.

(10) Patent No.: US 11,516,208 B2
(45) Date of Patent: Nov. 29, 2022

(54) SYSTEM AND METHOD FOR MERGING ACCOUNTS

(71) Applicant: SHOPIFY INC., Ottawa (CA)

(72) Inventors: Lalith Rallabhandi, Ottawa (CA); Zhi Yang Chen, Ottawa (CA)

(73) Assignee: SHOPIFY INC., Ottawa (CA)

( * ) Notice: Subject to any disclaimer, the term of this patent is extended or adjusted under 35 U.S.C. 154(b) by 359 days.

(21) Appl. No.: 16/861,751

(22) Filed: Apr. 29, 2020

(65) Prior Publication Data

US 2021/0344663 A1    Nov. 4, 2021

(51) Int. Cl.
*H04L 29/06*    (2006.01)
*H04L 9/40*    (2022.01)
*G06F 16/22*    (2019.01)
*G06F 7/14*    (2006.01)
*G06Q 30/06*    (2012.01)

(52) U.S. Cl.
CPC .............. *H04L 63/083* (2013.01); *G06F 7/14* (2013.01); *G06F 16/2255* (2019.01); *G06Q 30/0609* (2013.01)

(58) Field of Classification Search
CPC ..... H04L 63/083; G06F 16/2255; G06F 7/14; G06Q 30/0609
See application file for complete search history.

(56) References Cited

U.S. PATENT DOCUMENTS

| | | | |
|---|---|---|---|
| 9,022,869 B1 * | 5/2015 | DeSanti | H04L 67/306 463/42 |
| 9,491,164 B1 * | 11/2016 | Fay | H04L 63/083 |
| 11,093,462 B1 * | 8/2021 | Rabbani | G06K 9/6224 |
| 2011/0204138 A1 * | 8/2011 | Ukuda | G06Q 40/02 235/379 |
| 2012/0004973 A1 * | 1/2012 | Postrel | G06Q 30/0226 705/14.27 |
| 2013/0124309 A1 * | 5/2013 | Traasdahl | G06Q 30/02 705/14.49 |
| 2015/0089354 A1 * | 3/2015 | Abrahami | G06F 16/958 715/235 |
| 2015/0262199 A1 * | 9/2015 | Taylor | G06Q 30/0201 705/7.29 |
| 2016/0034550 A1 * | 2/2016 | Ostler | G06F 16/21 707/722 |
| 2016/0035044 A1 * | 2/2016 | Xu | G06Q 40/12 705/30 |
| 2018/0081960 A1 * | 3/2018 | Raman | G06F 16/285 |
| 2018/0218069 A1 * | 8/2018 | Rege | G06F 16/9014 |

(Continued)

*Primary Examiner* — Shin-Hon (Eric) Chen

(57) ABSTRACT

A system and method for automatically merging accounts based on matching email addresses and passwords, is provided. The assumption made is that two or more accounts that have the same user identifier or ID (e.g. email address) and the same password belong to the same user. Generally, in order to log into an account, the user requires is a user ID or username (e.g. an email address), password and store ID, for example URL. Typically, plaintext passwords are not stored centrally for security reasons, but instead hashed passwords are stored. When a user logs in with a plaintext password and username, the plaintext password is processed as it would be for other accounts with the same user ID, to see if the password works for those accounts. If it does work, then the same plaintext password applies, and the accounts are automatically merged.

24 Claims, 7 Drawing Sheets

(56) References Cited

U.S. PATENT DOCUMENTS

| | | | | |
|---|---|---|---|---|
| 2018/0225750 A1* | 8/2018 | Caldwell | ............... | G06F 16/248 |
| 2018/0367495 A1* | 12/2018 | Kim | ..................... | H04L 12/185 |
| 2019/0004727 A1* | 1/2019 | Volvovski | ............. | G06F 3/0608 |
| 2019/0372961 A1* | 12/2019 | Circosta | ................ | H04L 9/3263 |
| 2020/0104475 A1* | 4/2020 | Guionneau | ........... | G06F 21/602 |
| 2020/0219094 A1* | 7/2020 | Dikhit | ................... | H04L 9/3247 |
| 2021/0027365 A1* | 1/2021 | Resheff | ............. | G06Q 20/4014 |
| 2021/0201279 A1* | 7/2021 | Mossler | ............. | G06Q 20/4014 |

\* cited by examiner

FIG. 7

E-Commerce Platform | Search | JG John's Apparel / Jonny B. Good

- Home
- Orders
- Products
- Customers
- Reports
- Discounts
- Apps

SALES CHANNELS
- Online Store
- Mobile App

View all channels

Settings

Good afternoon, Jonny B..
Here's what's happening with your store today.

Today's total sales   Today's visits
$98.00                1

● Update your Platform Payments tax details
We require additional information to verify your identity.
[Update tax details]

● Advanced Cash on Delivery has been deactivated for your store
[See why]

All channels ⌄ | Today ⌄

TOTAL SALES
$98.00

$125
$75
$25
       12am    8pm    4pm    11pm
                              Jun 1
                              2 orders TOTAL SALES BY CHANNEL        View dashboard
Online Store                  Jun 1
$0.00                         0 orders Mobile app
$0.00                         0 orders Shopify POS (126 York St.)
$0.00                         0 orders

SYSTEM AND METHOD FOR MERGING ACCOUNTS

FIELD

The application relates to accounts, for example accounts with online stores, and to systems and methods of merging such accounts.

BACKGROUND

In an E-commerce context, it is common for a merchant to own multiple stores that are implemented on a common e-commerce platform. The merchants' interactions with these multiple stores are treated as separate accounts. The platform may not be even aware that the same merchant owns the multiple stores. The merchant performs separate sign-on activities for each of the stores to perform merchant side activities. While a merchant may have the option of merging accounts manually, merchants may be reluctant to do so.

SUMMARY

A system and method for automatically merging accounts based on matching email addresses and passwords, is provided. The assumption made is that two or more accounts that have the same user identifier or ID (e.g. email address) and the same password belong to the same user. The two accounts may be set up for two different stores, for example, each store having a different URL. Generally, in order to log into an account, the user requires a user ID or username (e.g. an email address), password and store ID, for example URL. Some existing accounts may be associated with multiple URLs.

Typically, plaintext passwords are not stored centrally for security reasons, but instead hashed passwords are stored. When a user logs in with a plaintext password and username, the plaintext password is processed as it would be for other accounts with the same user ID, to see if the password works for those accounts. If it does work, then the same plaintext password applies, and the accounts are automatically merged.

According to one aspect of the present invention, there is provided a system comprising: an account database containing for each of a plurality of accounts a stored hashed password, a user ID; an authentication interface for receiving a plaintext password and user ID to access a first account of said plurality of accounts associated with the user ID, and for determining a first hashed password computed from the plaintext password and a first hashing function, and allowing access to the first account if the user ID and the first hashed password matches a stored user ID and hashed password for the first account; an account merger that determines a second hashed password computed from the plaintext password and a second hashing function associated with a second account having the same user ID as said first account and merges the first and second accounts into a merged account if the user ID and second hashed password matches a stored user ID and hashed password for the second account.

In some embodiments, for each account another hash function input value is stored in association with the account; the first hashed password is computed using the first hashing function based on the plaintext password and the another hash function input value stored in association with the first account; and the second hashed password is computed using the second hashing function based on the plaintext password and the another hash function input value stored in association with the second account.

In some embodiments, the another hash function input value stored in association with the first account is a string that is combined with the plaintext password in a predetermined manner before using the first hash function or a seed to be used by the first hash function to compute the first hashed password or a repetition indicator that indicates how many times the first hash function should be iterated to produce the first hashed password; and the another hash function input value stored in association with the second account is a string that is combined with the plaintext password in a predetermined manner before using the second hash function or a seed to be used by the second hash function to compute the second hashed password or a repetition indicator that indicates how many times the second hash function should be iterated to produce the second hashed password.

In some embodiments, the first and second hash functions are the same.

In some embodiments, the first and second hash functions are different.

In some embodiments, the account merger, for each account feature for which there is a first value for the first account and a second different value for the second account, uses the first value or the second value in the merged account.

In some embodiments, the system further comprises a user interface for obtaining user input on which of the first value and the second value to use for at least one account feature.

In some embodiments, for at least one account feature, the account merger selects the first value or the second value to be used in the single account based on a rule.

In some embodiments, the rule is one of: use value that was associated with a most recent account access; use value that is associated with the account that was used more often; use value that is most frequently used across the accounts being merged.

In some embodiments, when a first level of security exists for the first account and a second different level of security exists for the second account, the merged account is configured with a level of security that is the higher of the first level and the second level.

In some embodiments, when a first level of security exists for the first account and a second different level of security exists for the second account, the system is configured to require the level of security that is the higher of the first level and the second level to be met before merging accounts.

In some embodiments, the system is further configured to: when the second account is configured with multi-factor authentication, generate a user request to complete multi-factor authentication on the second account before merging the accounts.

In some embodiments, the system comprises an e-commerce platform, wherein each account is with a particular store implemented by the e-commerce platform.

According to another aspect of the present invention, there is provided a processor implemented method comprising: storing for each of a plurality of accounts a stored hashed password and a user ID; receiving a plaintext password and user ID to access a first account of said plurality of accounts associated with the user ID; determining a first hashed password computed from the plaintext password and a first hashing function, and allowing access to the first account if the user ID and the first hashed password matches a stored user ID and hashed password for the first account;

determining a second hashed password computed from the plaintext password and a second hashing function associated with a second account having the same user ID; merging the first and second accounts into a merged account if the user ID and second hashed password matches a stored user ID and hashed password for the second account.

In some embodiments, for each account storing another hash function input value in association with the account; the first hashed password is computed using the first hashing function based on the plaintext password and the another hash function input value stored in association with the first account; and the second hashed password is computed using the second hashing function based on the plaintext password and the another hash function input value stored in association with the second account.

In some embodiments, the another hash function input value stored in association with the first account is a string that is combined with the plaintext password in a predetermined manner before using the first hash function or a seed to be used by the first hash function to compute the first hashed password or a repetition indicator that indicates how many times the first hash function should be iterated to produce the first hashed password; and the another hash function input value stored in association with the second account is a string that is combined with the plaintext password in a predetermined manner before using the second hash function or a seed to be used by the second hash function to compute the second hashed password or a repetition indicator that indicates how many times the second hash function should be iterated to produce the second hashed password.

In some embodiments, the first and second hash functions are the same.

In some embodiments, the first and second hash functions are different.

In some embodiments, merging the first and second accounts comprises, for each account feature for which there is a first value for the first account and a second different value for the second account, using the first value or the second value in the merged account.

In some embodiments, the method further comprises: obtaining user input on which of the first value and the second value to use for at least one account feature.

In some embodiments, the method further comprises: for at least one account feature, selecting the first value or the second value to be used in the single account based on a rule.

In some embodiments, the rule is one of: use value that was associated with a most recent account access; use value that is associated with the account that was used more often; use value that is most frequently used across the accounts being merged.

In some embodiments, the method further comprises: when a first level of security exists for the first account and a second different level of security exists for the second account, configuring the merged account with a level of security that is the higher of the first level and the second level.

In some embodiments, the method further comprises: when a first level of security exists for the first account and a second different level of security exists for the second account, requiring the level of security that is the higher of the first level and the second level to be met before merging accounts.

In some embodiments, the method further comprises: when the second account is configured with multi-factor authentication, generating a user request to complete multi-factor authentication on the second account before merging the accounts.

In some embodiments, each account is with a particular store implemented by an e-commerce platform.

BRIEF DESCRIPTION OF THE DRAWINGS

Embodiments of the disclosure will now be described with reference to the attached drawings in which:

FIG. 7 is an example of a home page of a merchant, according to one embodiment.

DETAILED DESCRIPTION

Figure 1:
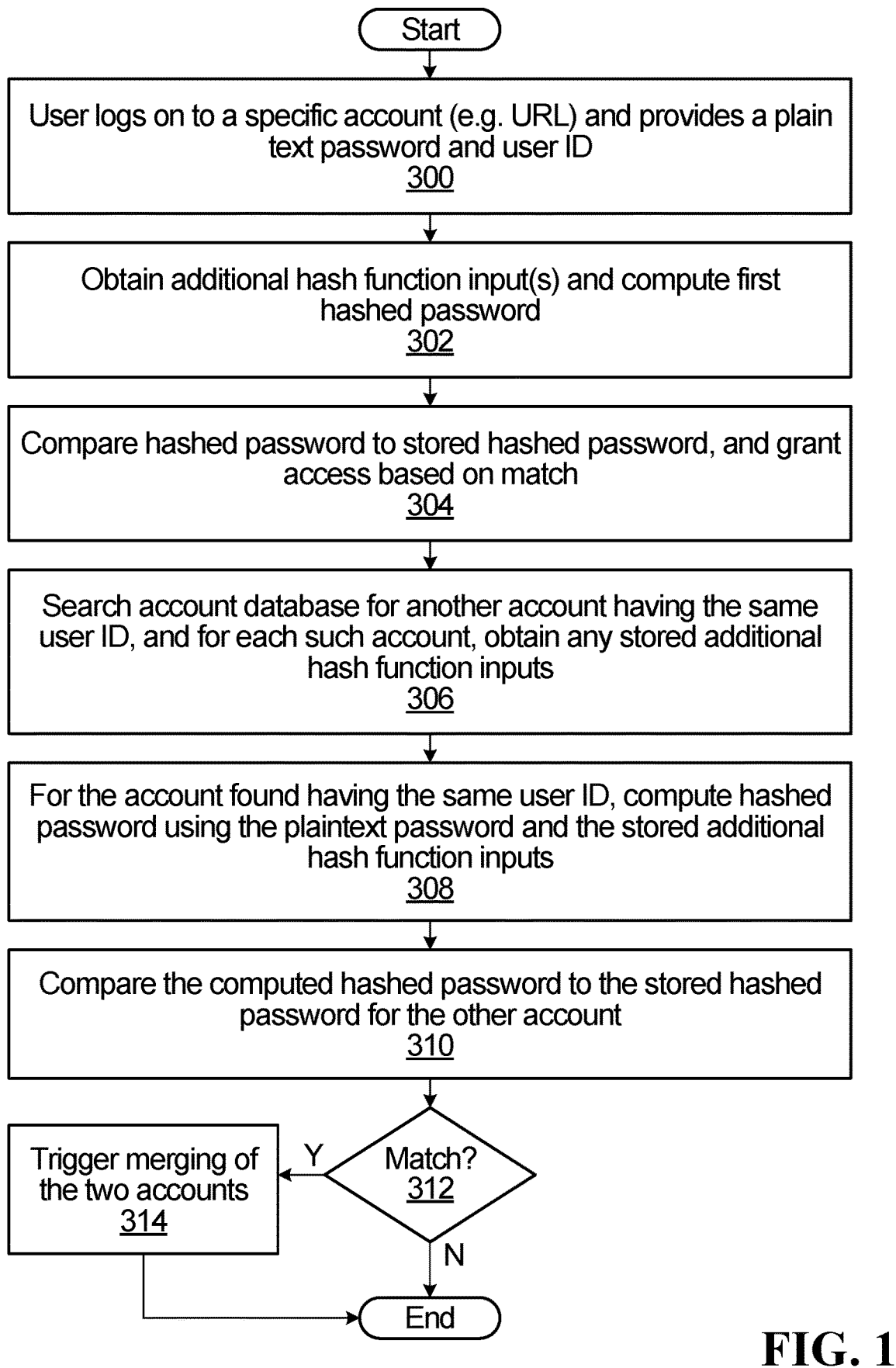
FIG. 1 is a flowchart of a method of deciding whether to merge two accounts.

It would be desirable to merge the multiple accounts of a single user, for example where a merchant has separate accounts for each of two or more stores on an e-commerce platform. This would provide benefits to the user similar to those provided by single sign-on solutions.

Many merchants use the same email and password for each of their stores. More generally, many users use the same user ID and password for multiple accounts of the same type (e.g. multiple stores on an e-commerce platform) or for multiple accounts including accounts having different types.

A system and method for automatically merging accounts based on matching email addresses and passwords, is provided. The assumption made is that two or more accounts that have the same user ID and the same password belong to the same user. The two accounts may be set up for two different stores, for example, each store having a different URL. So the account login (or authentication) information generally required includes the user ID (e.g. email address), password and store ID, for example a URL. Some existing accounts may be associated with multiple URLs.

When account merging takes place, for example between two accounts, the store IDs (URL(s)) associated with the first account, and the store IDs (URL(s)) associated with the second account will all be associated and accessible through the single merged account.

For security reasons, it is not usually the case that plaintext passwords are stored directly. Rather, a hash of the password is stored. This way, if a database containing all the hashed passwords is hacked, the passwords are not available directly.

A feature of hash functions is that the same input will always yield the same output. Various hash functions exist that expect different inputs. The input always includes the plaintext password. Additional hash function input values may include:

A) An additional string to be combined with the plaintext password before computing the hash; the characters of the additional string are combined in a predetermined manner, for example at the beginning of the plaintext password, at the end, or in some other manner. A specific example of such an additional string is salt which is a string that is prepended to the plaintext password. Salts may be generated in different ways; one way is to use a random generator to generate random known length hexadecimal strings which may be used as salts. Another method is to use a known seed and a known function to generate a salt based on the function/seed combo.

B) Hash function seed—a hash function seed is another input to the hash function, for example to compute a salt as detailed above;

C) Repetition indicator—this indicates how many times the hash function should be iterated to reach a final answer.

In some embodiments, bcrypt, which is an internet standard hashing algorithm is used for at least some of the accounts. A typical bcrypt hash comes with 3 parts: a bcrypt algorithm version, cost factor (how many iterations a password has to be hashed, same as repetition indicator above), and salt.

The input to the hash may consist of the three fields separated by '$', for example:
$2a$10$vI8aWBnW3fID.ZQ4/zo1G.q11Rps.9cGLcZEiGDMVr5yUP1KUOYTa
where 2a is the version, 10 is the cost factor, and the last part is the salt.

For two different store IDs, a user may use the same user ID and the same plaintext password, but the hashed password will be different either because a different hash function is applied, and/or because one or more of the other hash function input values are different.

If a common hash function is employed across multiple stores, and the common function only uses the plaintext password as input, meaning no additional hash function inputs, it would be possible to identify pairs of accounts that use the same user ID and password simply by comparing the hashed passwords stored for the same user ID for the multiple stores.

However, when there are additional hash function inputs, this is no longer possible, as depending on the additional hash function inputs, the stored hash values will be different even for the same plaintext password. A plain text version of the password and the additional hash function inputs are both required to compute the hash correctly.

A store of existing accounts is maintained. For each account, this will include the email address (or other user ID), and hashed password, and an indication of which store the account is with, e.g. by including the URL. If there are any additional hash function inputs, these are stored as well. Typically, these are stored separately from the hashed password storage for security purposes. The account also has other features/preferences. A few specific examples of other account features/preferences that may be used include:
 avatar;
 address;
 payment methods;
 contact information;
 language settings A method of deciding whether to merge two accounts will now be described with reference to the flowchart of FIG. 1. For this example, information is stored in an account database for each account including a user name, hashed password, store ID, other account features. In block 300, a user logs into a specific account associated with a specific store ID (e.g. URL) and provides a plain text password and user ID.

In block 302, the additional hash function input(s) (if any) are obtained for that user ID and account, and a first the hashed password is computed using the plaintext password and the additional hash function input(s).

In block 304, the hashed password is compared to a value stored in an account database for that user ID and store ID. If there is a match, then authentication is successful, and the user is granted access to the account. Note, that if multi-factor authentication is required to access the specified account, then that must be completed in the normal manner before access to the account is granted.

In block 306, to identify possible accounts to merge, the account database is searched for all other accounts having the same user ID, and for each such account, the stored additional hash function inputs are obtained.

In block 308, for the account found having the same user ID, a hashed password is computed using the plaintext password and the stored additional hash function inputs. Note that the hash function may be the same or different compared to that used to compute the first hashed password. For example, one of the hash functions may require a seed, and the other may require a salt. They may have respective repetitions indications that may be the same or different.

In block 310, the computed hashed password is compared to the stored hashed password for the other account.

If there is a match (yes path block 312), then the plaintext password for the specific account is the same as the plaintext password for the other account, this is used as a possible trigger to merge the two accounts at block 314 into one account having that user ID and password. The merged account will then be associated with the store IDs of the two accounts being merged. If there is no match, then the method ends, but note if there are multiple accounts with matching user ID, then steps 308,310,312 may be performed multiple times. Note it is not possible to conduct this comparison without access to the plaintext password received during account login, therefore the comparison can only be conducted following a live login.

Block 312 refers to a possible trigger, because in some embodiments, additional criteria must be satisfied before merging is triggered. In some cases, the two accounts that are being merged may be configured with different security settings. For example, two factor authentication (more generally multi-factor authentication) may be used for one store (e.g. password and SMS) and a different authentication scheme (e.g. single factor, or different multi-factor) may be used for the other.

In some embodiments, if the user logs into the less secure account first, the user may be required to complete authentication for the second more secure account before the accounts are merged. For example, if the first account only relies on entry of a user ID and password, but the second account is configured with two-factor authentication requiring user ID, password and entry of an SMS code for example, the user is required to complete the SMS step for the second account before merging. On the other hand, if the first account relies on user ID, password and SMS, and the second account relies on only user ID and password, then after the user completes authentication for the first account, no further authentication is needed before merging.

In another example, when both accounts require two factor authentication, the user may be required to perform two factor authentication for both accounts before merging. Optionally, the user does not have to perform two factor authentication again for the initially logged in account.

In another embodiment, if the security setting for the first account (active login) is greater than the second account, then merging can proceed. More generally, merging can be allowed to proceed for some defined set of permutations of first and second securities. If a particular permutation of the first and second securities of the two accounts potentially being merged belongs to the defined set, then merging goes ahead automatically. For example, if a set of possible securities is abstractly represented as S1,S2,S3,S4, the defined set might include permutations including {S1,S1}, {S2,S2}, {S3,S3} {S4, S4} {S1, S3}, {S2,S4}. For a given account merging operation, if the first and second securities is one of the defined set, then merging is allowed to proceed automatically, and otherwise, it is not. In some embodiments, the level of security that is the higher of the levels for the two accounts must be met before merging the accounts.

Optionally, a feature is provided to effectively undo an account merge, but in this case, the user will be required to provide a different user ID, such that going forward, the accounts are separated by at least the user ID (e.g email address).

Optionally, before merging, the user is invited to confirm that the accounts should be merged. If the user says no, they must provide a new user ID for one of the accounts.

Account Merging

The method of FIG. 1 is used to determine whether to merge accounts. Once the decision to merge accounts is made, various options exist.

User name and plaintext password for merged account: For the merged account, the same user ID and plaintext password are employed.

Hashing algorithm for the merged account: For the merged account, the hashing function of one of the two accounts being merged may be used, or an entirely different hashing function may be used.

Additional hash function inputs for the merged account: for the merged account, the hash function inputs of one of the two accounts being merged may be used in which case the hashing function for that account is also used, and the stored hashed password for the merged account is the same as the original hashed password of that account, or new hash function inputs may be used, in which a new hashed password for the merged account is computed and stored.

Security features for Merged Account: As noted previously, in some cases the two accounts that are being merged may have different security settings. For example, two factor authentication (more generally multi-factor authentication) may be used for one store (e.g. password and SMS) and a different authentication scheme (e.g. single factor, or different multi-factor) may be used for the other.

In some embodiments, the more secure security settings/authentication scheme are applied to the merged account. In another embodiment, one or more rules are applied to decide on the security for the merged account. In some cases, a different type of security (not used for either of the two accounts) is applied for the merged account.

Other fields/features for Merged Accounts, such as avatar, address, payment methods, contact information, language preference: various rules may be specified, which can be the same or different for each field:

a. Determine directly from the logged in account
b. Use the most frequently used value across multiple accounts
c. Use the value from the most frequently used account;
d. Automatically choose certain, or all fields from the most frequently used account
e. Prompt user to make a selection for one or more fields that do not match across the accounts to be merged.

The provided approach may be used to merge two accounts on the same E-commerce platform (e.g. Shopify). In another embodiment, the approach may be used to merge two accounts on multiple platforms. More generally, the approach can be used to merge two accounts in the same SAAS (software as a service) platform. In another embodiment, the approach may be used to merge two accounts on multiple SAAS platforms. In these cases, the user may have a first account with a first service instance on a SAAS platform and a second account with a second service instance on the same or different SAAS platform.

This approach may be used to merge two accounts of completely different services on different platforms, —e.g. Facebook® and Google®.

In another embodiment, the approach is used to merge accounts of two systems that are integrated with a federated identity. In this case, the provided approach would be one method of creating a federated identity.

Figure 2:
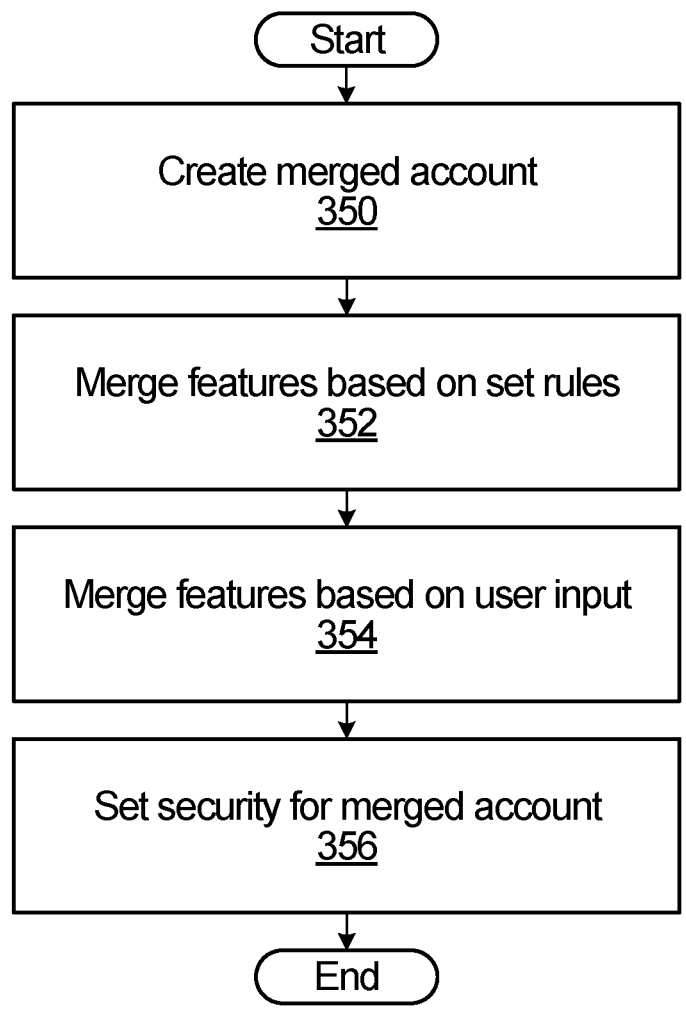
FIG. 2 is a flowchart of a method of merging two accounts.

Referring now to FIG. 2, shown is a flowchart of a method of merging two accounts provided by an embodiment of the disclosure. The method begins in block 350 with the creation of the merged account, which at the very least, has the same user ID and plaintext password (although the plaintext password is not stored) and is associated with and therefore provides access to both of the stores (more generally service instances) previously accessed through separate accounts. In block 352, one or more features of the two accounts are merged based on a set of rules. In block 354, one or more features of the two accounts are merged based on user input. Examples of the functionality for blocks 352,354 have been provided above. If all features are merged without user input, then block 352 is not needed. Similarly, if all features are merged based on user input, then block 354 is not needed. In block 356, the security for the merged account is set. This will establish the security that will apply to the merged account. Examples of how this may be performed have been given above.

Figure 3:
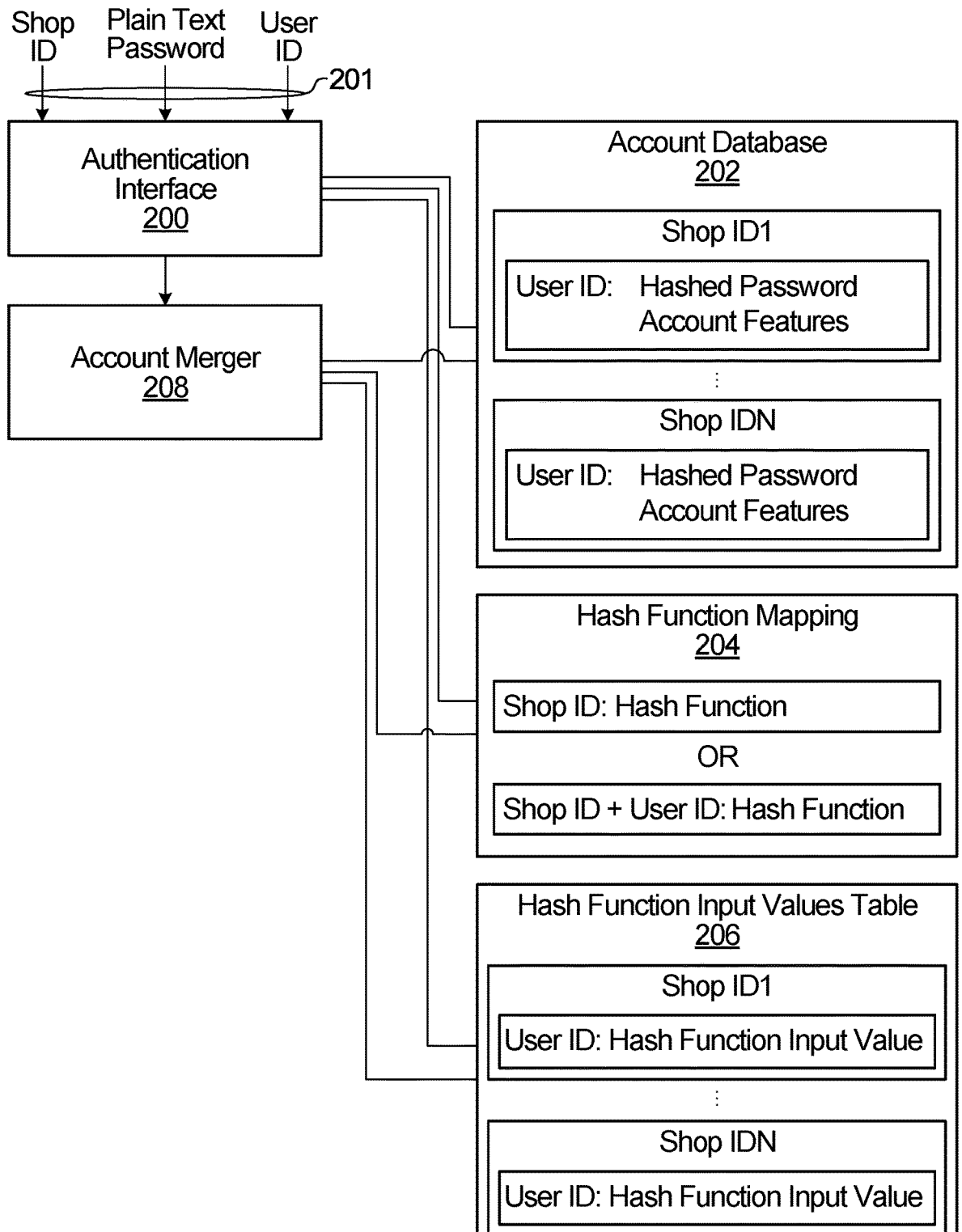
FIG. 3 is a block diagram of an authentication system with account merging provided by an embodiment of the disclosure.

Referring now to FIG. 3, shown is a block diagram of an authentication system with account merging provided by an embodiment of the disclosure.

The system has an authentication interface 200 that handles user authentication as discussed below based on inputs 201 that include store ID, user ID and plaintext password in the illustrated example.

There is an account database 202 stored in a memory of the system (not shown), containing account information. In the illustrated example, accounts are grouped by store ID, but this need not be the case. For each store having a respective store ID, there is a list of user accounts, each user account having a user ID, a hashed password, and optionally also including one or more account features.

There is a hash function mapping 204 stored in a memory of the system (not shown). The hash function mapping 204 indicates for each store what hash function to apply when performing authentication. Alternatively, the mapping can indicate which hash function to apply for a given store ID and user ID combination. Note when only a single hash function is employed for all accounts that might be merged, then there is no need for the hash function mapping 204. Alternatively, the appropriate hash function to apply may be made apparent from inputs to the authentication interface 200.

There is a hash function input values table 206 contains hash function input values, if any, for each account. In the illustrated example, this is organized similarly to the account database, with the records for a given store ID grouped together. Examples of hash function input values have been described above, including additional strings, hash function seeds, and repetition indicators.

There may be one or more hash function input values for each account. It is also possible that for some accounts, there are no hash function input values, but this would be relatively weak from a security perspective. In an extreme case, where all accounts have no hash function input values, there would be no need for the hash function input values table 206.

Also shown is an account merger 208, which operates to identify accounts that have the same user ID, and the same plaintext password, and to merge these accounts.

In operation, when a user accesses a store having a store ID, for example by accessing a particular URL, the user provides a user ID and plaintext password for processing by the authentication interface 200. The authentication interface 200 looks up the hash function to be applied in the hash function mapping 204, and looks up any hash function input values stored in the hash function input values table 206 for that user ID and store ID. Next, the authentication interface computes a hashed password, using the hash function to be applied, and the hash function input values if any. If this matches the hashed password stored in the account database 202, then access is granted.

At this point, the account merger 208 operates to see if the account which was just accessed (the first account) can be merged with another account. The first step is determining if there are any other accounts (for any store) that have the same user ID. Each such account (second account) is associated with a store ID, and has a stored hashed password for the account. A hashed password for the second account is computed from the input plaintext password using the hash function specified for the second account in the hash function mapping table 204, and using any hash function input values specified in the hash function input values table 206 for the second account. If the hashed password computed for the second account matches the stored hashed password for the second account, then it can be concluded that the plaintext password which granted access to the first account is also the plaintext password to the second account, and this is used as a basis for merging the two accounts.

Figure 4:
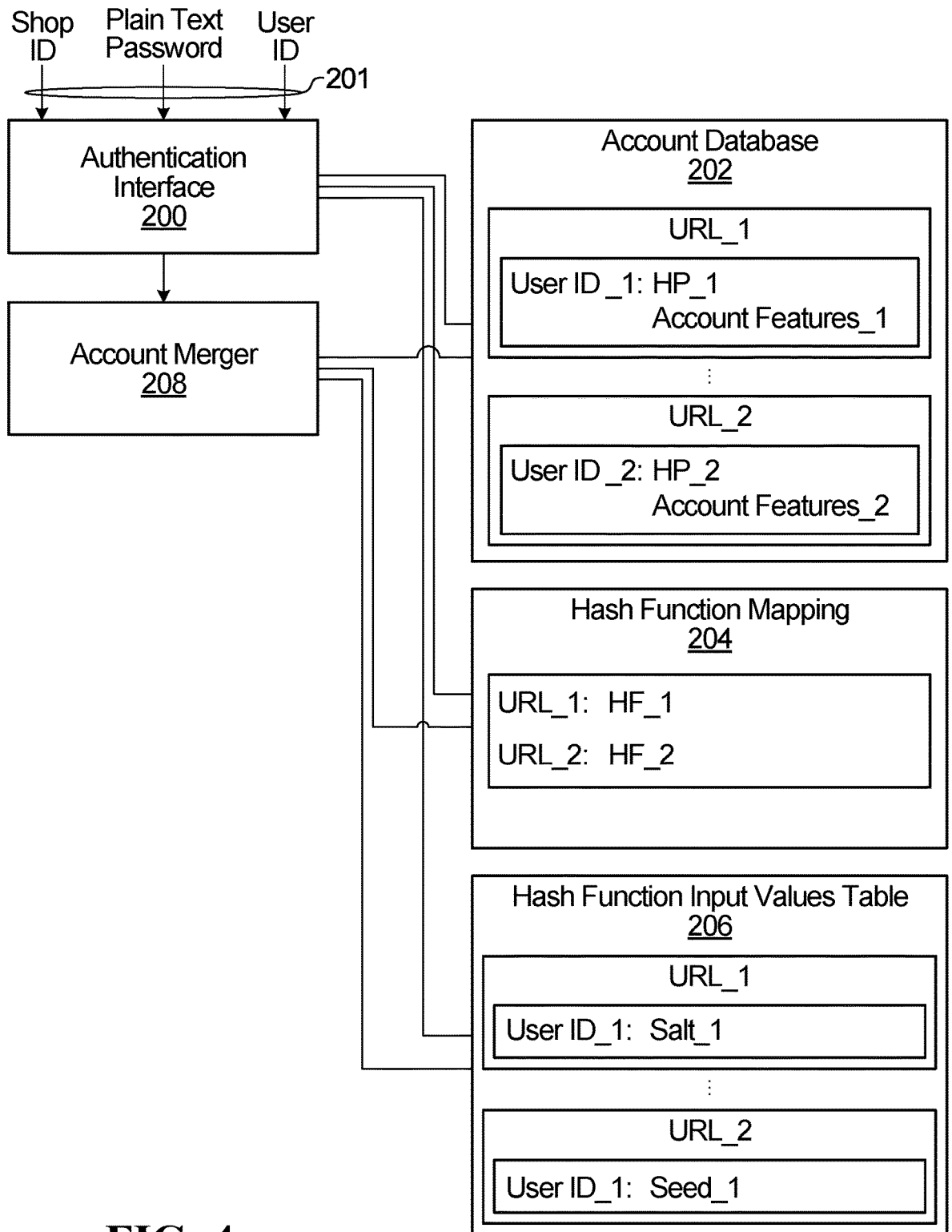
FIG. 4 shows the system of FIG. 3 with example accounts prior to merging.

An example will now be described with reference to FIG. 4. For a first store having URL_1, there is an account with user ID_1, hashed password HP_1, and account features_1. For a second store having URL_2, there is an account with the same user ID_1, hashed password HP_2, and account feat ures_2.

Hashing function HF_1 is to be applied for access to URL_1, and hashing function HF_2 is to be applied for access to URL_2. HF_1 uses salting to compute hashed passwords, and expects a salt as a hash function input value. HF_2 uses a seed to compute hashed passwords, and expects a seed as a hash function input value.

For URL_1, there is hash function input value SALT_1 for user ID_1, and for URL_2, there is a hash function input value SEED_1 for user ID_1

For the purpose of this example, it is assumed the same plaintext password PTPW_1 applies for the two accounts. When a user authenticates to URL_1 using the proper plaintext password PTPW_1, HF_1 is applied to the plaintext password using the plaintext password and SALT_1, this will result in the calculation of HP_1 which matches that stored in the account database.

For account merging purposes, it is determined there is another account with user ID_1, namely the account with URL_2, for which the hashed password is HP_2, and for which HF_2 applies using seed_1. Using the plaintext password PTPW_1, and seed_1, HF_2 is applied to produce a hashed password. Since we have assumed that this account does use the same plaintext password, the computed hashed password will be HP_2 which matches that stored in the account database. Because there is a match, the two accounts can be merged. Of course, if there was no match, then there would be no account merge. Detailed examples of how account merging have been described above, and any of those may be performed for the system of FIG. 4.

Figure 5:
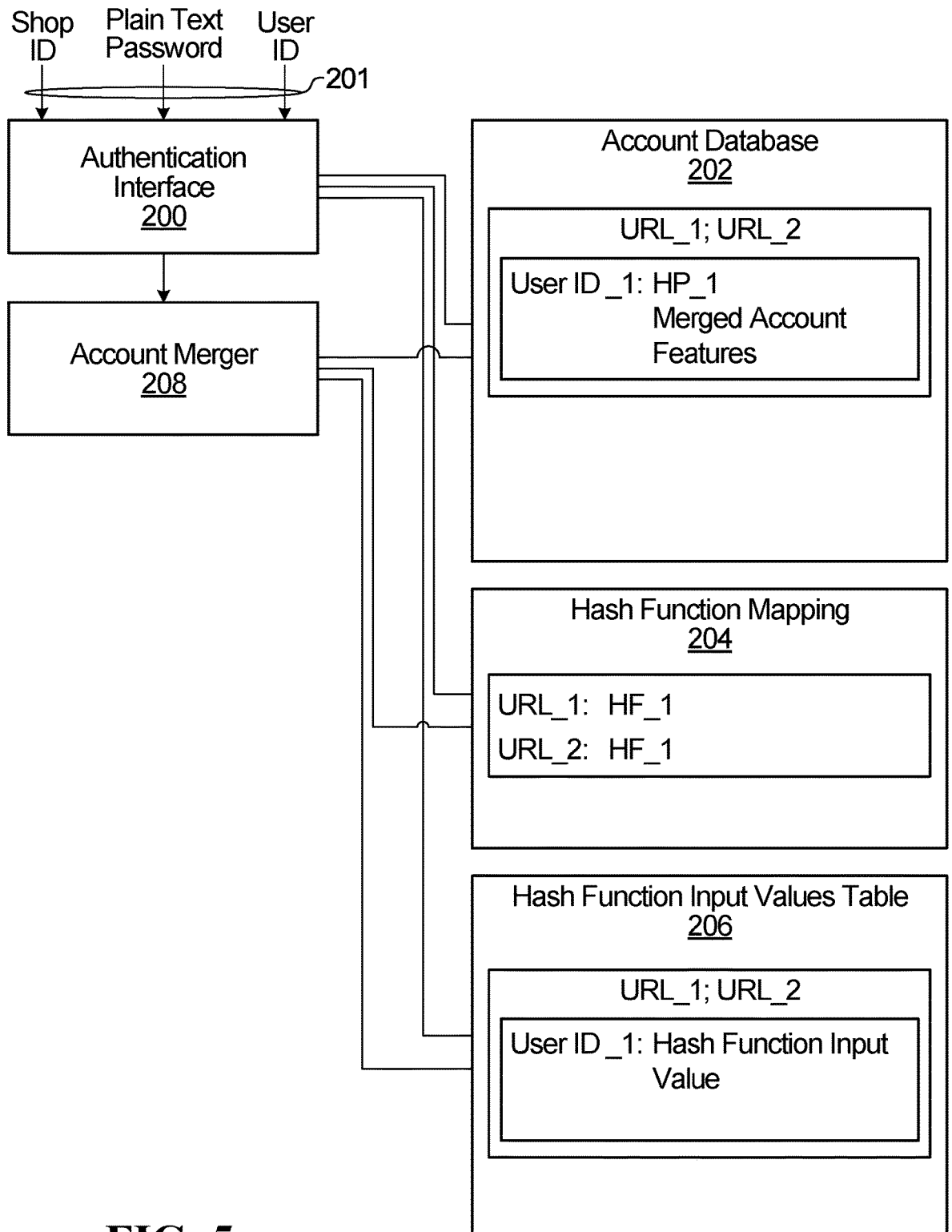
FIG. 5 shows the example of FIG. 4 after account merging.

FIG. 5 shows a continuation of this example after account merge. Now there is an account with user ID_1, hashed password HP_1 that applies to the two stores having URL_1 and URL_2 respectively. A set of merged account features applies for the merged account. A single hash function HF_1 is now applied for both accounts, and there is a common hash function input value.

In some embodiments, before the merger of the two accounts is performed, and e-mail verification is performed. The account merger 208 (or some other component of the system) may send an email message to the email address which contains a link to the authentication system with account merging, or a link to an e-commerce platform 100 and ask the user to verify ownership or control of the email account via a link or button in the verification email message. Such a link may be valid for a set amount of time, such as 24 hours, or may continue to be valid without a set expiration time. In some embodiments, following e-mail verification, the user is given the option of configuring the account merge process.

Figure 6:
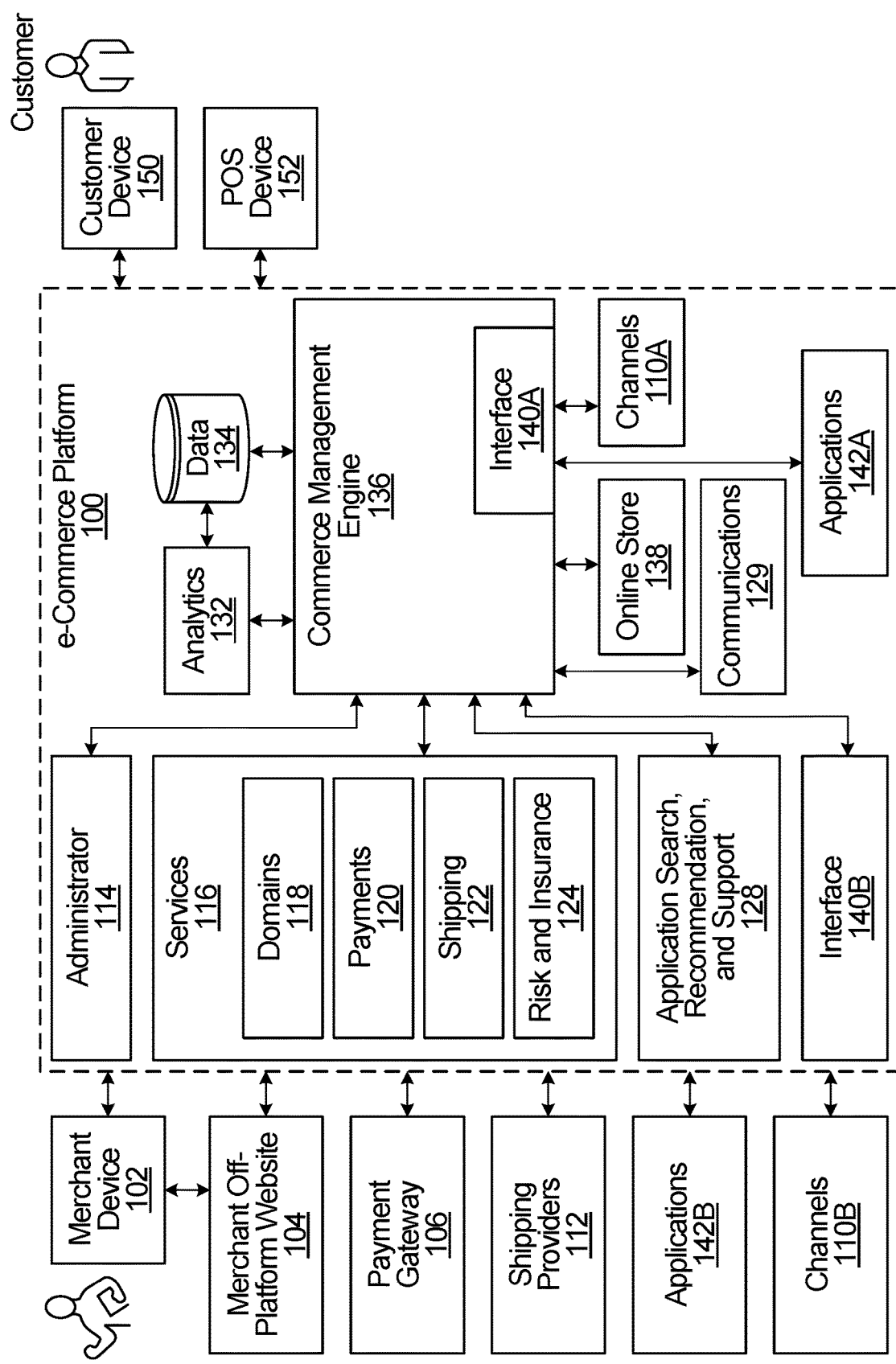
FIG. 6 is a block diagram of an e-commerce platform, according to one embodiment.

With reference to FIG. 6, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS device 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 7 which will be described with further reference to FIG. 6, depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2B. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 6 in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may make a request, such as to a predefined callback URL.

The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements, and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

The e-commerce platform 100 may be providing sales channels for multiple merchants, for their respective customers, and for varying types of merchandise. Payment gateways 106 are provided by the e-commerce platform or by external parties to process transactions in an e-commerce environment.

The E-commerce platform of FIG. 6 can be used to implement embodiments of the invention. Specifically the account merging systems and methods described herein may be implemented within the depicted e-commerce platform.

Numerous modifications and variations of the present disclosure are possible in light of the above teachings. It is therefore to be understood that within the scope of the appended claims, the disclosure may be practiced otherwise than as specifically described herein.

The invention claimed is:

1. A system comprising:
    a processor and a memory;
    an account database containing for each of a plurality of accounts a stored hashed password, a user ID;
    an authentication interface for receiving a plaintext password and user ID to access a first account of said plurality of accounts associated with the user ID, and for determining a first hashed password computed from the plaintext password and a first hashing function associated with the first account, and allowing access to the first account if the user ID and the first hashed password matches a stored user ID and hashed password for the first account, wherein for each account another hash function input value is stored in association with the account and the first hashed password is computed using the first hashing function based on the plaintext password and the another hash function input value stored in association with the first account;
    an account merger that determines a second hashed password computed from the plaintext password and a second hashing function associated with a second account having the same user ID as said first account and merges the first and second accounts into a merged account if the user ID and second hashed password matches a stored user ID and hashed password for the second account, wherein the first and second accounts are different accounts having the same user ID, and the second hashed password is computed using the second hashing function based on the plaintext password and the another hash function input value stored in association with the second account;
    wherein the authentication interface and account merger are implemented using said processor and memory.

2. The system of claim 1 wherein:
    the another hash function input value stored in association with the first account is a string that is combined with the plaintext password in a predetermined manner before using the first hash function or a seed to be used by the first hash function to compute the first hashed password or a repetition indicator that indicates how many times the first hash function should be iterated to produce the first hashed password; and
    the another hash function input value stored in association with the second account is a string that is combined with the plaintext password in a predetermined manner before using the second hash function or a seed to be used by the second hash function to compute the second hashed password or a repetition indicator that indicates how many times the second hash function should be iterated to produce the second hashed password.

3. The system of claim 1 wherein the first and second hash functions are the same.

4. The system of claim 1 wherein the first and second hash functions are different.

5. The system of claim 1 wherein the account merger, for each account feature for which there is a first value for the first account and a second different value for the second account, uses the first value or the second value in the merged account.

6. The system of claim 5 further comprising:
    a user interface for obtaining user input on which of the first value and the second value to use for at least one account feature.

7. The system of claim 5 wherein for at least one account feature, the account merger selects the first value or the second value to be used in the single account based on a rule.

8. The system of claim 7 wherein the rule is one of:
    use value that was associated with a most recent account access;
    use value that is associated with the account that was used more often;
    use value that is most frequently used across the accounts being merged.

9. The system of claim 1 wherein when a first level of security exists for the first account and a second different level of security exists for the second account, the merged account is configured with a level of security that is the higher of the first level and the second level.

10. The system of claim 1 wherein when a first level of security exists for the first account and a second different level of security exists for the second account, the system is configured to require the level of security that is the higher of the first level and the second level to be met before merging accounts.

11. The system of claim 1 further configured to:
    when the second account is configured with multi-factor authentication, generate a user request to complete multi-factor authentication on the second account before merging the accounts.

12. The system of claim 1 comprising an e-commerce platform, wherein each account is with a particular store implemented by the e-commerce platform.

13. A processor implemented method comprising:
    storing for each of a plurality of accounts a stored hashed password and a user ID;
    receiving a plaintext password and user ID to access a first account of said plurality of accounts associated with the user ID;
    determining a first hashed password computed from the plaintext password and a first hashing function associated with the first account, and allowing access to the first account if the user ID and the first hashed password matches a stored user ID and hashed password for the first account, wherein for each account another hash function input value is stored in association with the account and the first hashed password is computed using the first hashing function based on the plaintext password and the another hash function input value stored in association with the first account;

determining a second hashed password computed from the plaintext password and a second hashing function associated with a second account having the same user ID;

merging the first and second accounts into a merged account if the user ID and second hashed password matches a stored user ID and hashed password for the second account, wherein the first and second accounts are different accounts having the same user ID, and the second hashed password is computed using the second hashing function based on the plaintext password and the another hash function input value stored in association with the second account.

14. The method of claim 13 wherein:
the another hash function input value stored in association with the first account is a string that is combined with the plaintext password in a predetermined manner before using the first hash function or a seed to be used by the first hash function to compute the first hashed password or a repetition indicator that indicates how many times the first hash function should be iterated to produce the first hashed password; and the another hash function input value stored in association with the second account is a string that is combined with the plaintext password in a predetermined manner before using the second hash function or a seed to be used by the second hash function to compute the second hashed password or a repetition indicator that indicates how many times the second hash function should be iterated to produce the second hashed password.

15. The method of claim 13 wherein the first and second hash functions are the same.

16. The method of claim 13 wherein the first and second hash functions are different.

17. The method of claim 13 wherein merging the first and second accounts comprises, for each account feature for which there is a first value for the first account and a second different value for the second account, using the first value or the second value in the merged account.

18. The method of claim 17 further comprising:
obtaining user input on which of the first value and the second value to use for at least one account feature.

19. The method of claim 17 further comprising:
for at least one account feature, selecting the first value or the second value to be used in the single account based on a rule.

20. The method of claim 19 wherein the rule is one of:
use value that was associated with a most recent account access;
use value that is associated with the account that was used more often;
use value that is most frequently used across the accounts being merged.

21. The method of claim 13 further comprising:
when a first level of security exists for the first account and a second different level of security exists for the second account, configuring the merged account with a level of security that is the higher of the first level and the second level.

22. The method of claim 13 further comprising:
when a first level of security exists for the first account and a second different level of security exists for the second account, requiring the level of security that is the higher of the first level and the second level to be met before merging accounts.

23. The method of claim 13 further comprising:
when the second account is configured with multi-factor authentication, generating a user request to complete multi-factor authentication on the second account before merging the accounts.

24. The method of claim 13 wherein each account is with a particular store implemented by an e-commerce platform.

* * * * *